US010462263B2

(12) United States Patent
Ramesh et al.

(10) Patent No.: US 10,462,263 B2
(45) Date of Patent: Oct. 29, 2019

(54) MANAGEMENT SERVICE MIGRATION USING WEB APPLICATIONS

(71) Applicant: AIRWATCH LLC, Atlanta, GA (US)

(72) Inventors: Ashwin Ramesh, Bangalore (IN); Shiva Subbha Ram, Bangalore (IN)

(73) Assignee: AIRWATCH LLC, Atlanta, GA (US)

(*) Notice: Subject to any disclaimer, the term of this patent is extended or adjusted under 35 U.S.C. 154(b) by 187 days.

(21) Appl. No.: 15/598,329

(22) Filed: May 18, 2017

(65) Prior Publication Data
US 2018/0145877 A1 May 24, 2018

(30) Foreign Application Priority Data

Nov. 22, 2016 (IN) .............................. 201641039911

(51) Int. Cl.
*G06F 15/173* (2006.01)
*H04L 29/08* (2006.01)

(52) U.S. Cl.
CPC .............. *H04L 67/34* (2013.01); *H04L 67/02* (2013.01); *H04L 67/148* (2013.01); *H04L 67/18* (2013.01); *H04L 67/306* (2013.01)

(58) Field of Classification Search
CPC ....... H04L 67/34; H04L 67/148; H04L 67/18; H04L 67/306; H04L 67/02
See application file for complete search history.

(56) References Cited

U.S. PATENT DOCUMENTS

| 7,877,083 | B2* | 1/2011 | Chen | H04M 3/4931 379/218.01 |
| 8,229,415 | B1* | 7/2012 | Chen | G06Q 30/0282 455/422.1 |
| 9,913,132 | B1* | 3/2018 | Ghoshal | H04W 8/245 |
| 2005/0069136 | A1 | 3/2005 | Thornton et al. | |
| 2007/0180368 | A1* | 8/2007 | Huber | G16H 10/65 715/234 |
| 2007/0233997 | A1* | 10/2007 | Kobara | G06F 3/0605 711/170 |
| 2014/0122731 | A1* | 5/2014 | Burch | H04L 67/148 709/228 |

(Continued)

FOREIGN PATENT DOCUMENTS

WO 2014084967 6/2014

OTHER PUBLICATIONS

International Search Report mailed for PCT Application No. US2017/062857.

(Continued)

*Primary Examiner* — Richard G Keehn
(74) *Attorney, Agent, or Firm* — Thomas Horstemeyer, LLP

(57) ABSTRACT

Disclosed are various examples for client device migration. In one example, a client device is enrolled with a first management service. A user interface is generated that identifies a user request to enroll the client device with a second management service. An un-enrollment from the first management service is initiated. The un-enrollment from the first management service is initiated using an identifier of the client device. An enrollment with the second management service is initiated. The enrollment with the second management service is initiated using the identifier of the client device.

20 Claims, 8 Drawing Sheets

(56) References Cited

U.S. PATENT DOCUMENTS

| | | | | |
|---|---|---|---|---|
| 2014/0149492 A1* | 5/2014 | Ananthanarayanan | ...................... H04L 67/42 | 709/203 |
| 2015/0302007 A1* | 10/2015 | Sitka | ..................... G06F 16/214 | 707/602 |
| 2015/0381561 A1* | 12/2015 | Meltzer | ............... H04L 61/1511 | 709/206 |
| 2016/0065557 A1* | 3/2016 | Hwang | ................... H04L 63/08 | 726/1 |
| 2017/0093640 A1* | 3/2017 | Subramanian | .......... H04L 67/16 | |
| 2018/0005287 A1* | 1/2018 | Miyamoto | ......... G06Q 30/0613 | |
| 2018/0309758 A1 | 10/2018 | Jain et al. | | |

OTHER PUBLICATIONS

Office Action dated Jan. 14, 2019 for U.S. Appl. No. 15/598,332.
Office Action dated Jan. 14, 2019 for U.S. Appl. No. 15/598,321.

\* cited by examiner

MANAGEMENT SERVICE MIGRATION USING WEB APPLICATIONS

RELATED APPLICATIONS

Benefit is claimed under 35 U.S.C. 119(a)-(d) to Foreign Application Serial No. 201641039911 filed in India entitled "MANAGEMENT SERVICE MIGRATION USING WEB APPLICATIONS", on Nov. 22, 2016, by AIRWATCH LLC, which is herein incorporated in its entirety by reference for all purposes.

The present application is related in subject matter to U.S. patent application Ser. No. 15/598,321 and to U.S. patent application Ser. No. 15/598,332, which is incorporated herein by reference.

BACKGROUND

An enterprise can use a management service capable of protecting enterprise data, such as email and corporate documents, from theft, data loss, and unauthorized access. The enterprise can require devices used by employees to be enrolled with a management service to protect enterprise data. With the emergence of bring-your-own-device (BYOD) technology in the workplace, an enterprise can permit its employees to use their own devices to access enterprise data and require the employee to enroll their devices with a management service.

An enterprise can change management services used by the enterprise from one management service to another management service. However, changing management services on managed devices can be difficult. For example, a managed device might have to be un-enrolled from the previous management service and enrolled with the new management service. Administrators capable of migrating managed devices are often not in possession of the managed devices. Training the users of managed devices to perform this migration process can be a significant burden to administrators.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to management service migration for managed client devices. An enterprise use a management service to provide client devices with secure access to enterprise resources and can subsequently decide to use another management service. However, migrating client devices from one management service to another can be difficult. Current solutions are not scalable, and can require each employee using each of the client devices to coordinate with administrators to un-enroll or de-register each client device from a previous management service and subsequently enroll or register each client device with a new management service. This process can include logging in to the first management service, performing a manual un-enrollment process to un-enroll the client device from the previous management service, logging in to the new management service, and performing a manual enrollment process to enroll the client device with the new management service. To successfully migrate the enterprise to the new management service, this process must be repealed for each user of the enterprise.

When an enterprise decides to change management services, administrators are often not in possession of the client devices under management, while employees using these client devices can be incapable of performing a migration process without enlisting assistance from administrators, helpdesk staff, or IT professionals. However, examples described herein describe a migration service having mechanisms capable of guiding management service migration of client devices under management from a previous management service to a new management service.

Figure 1:
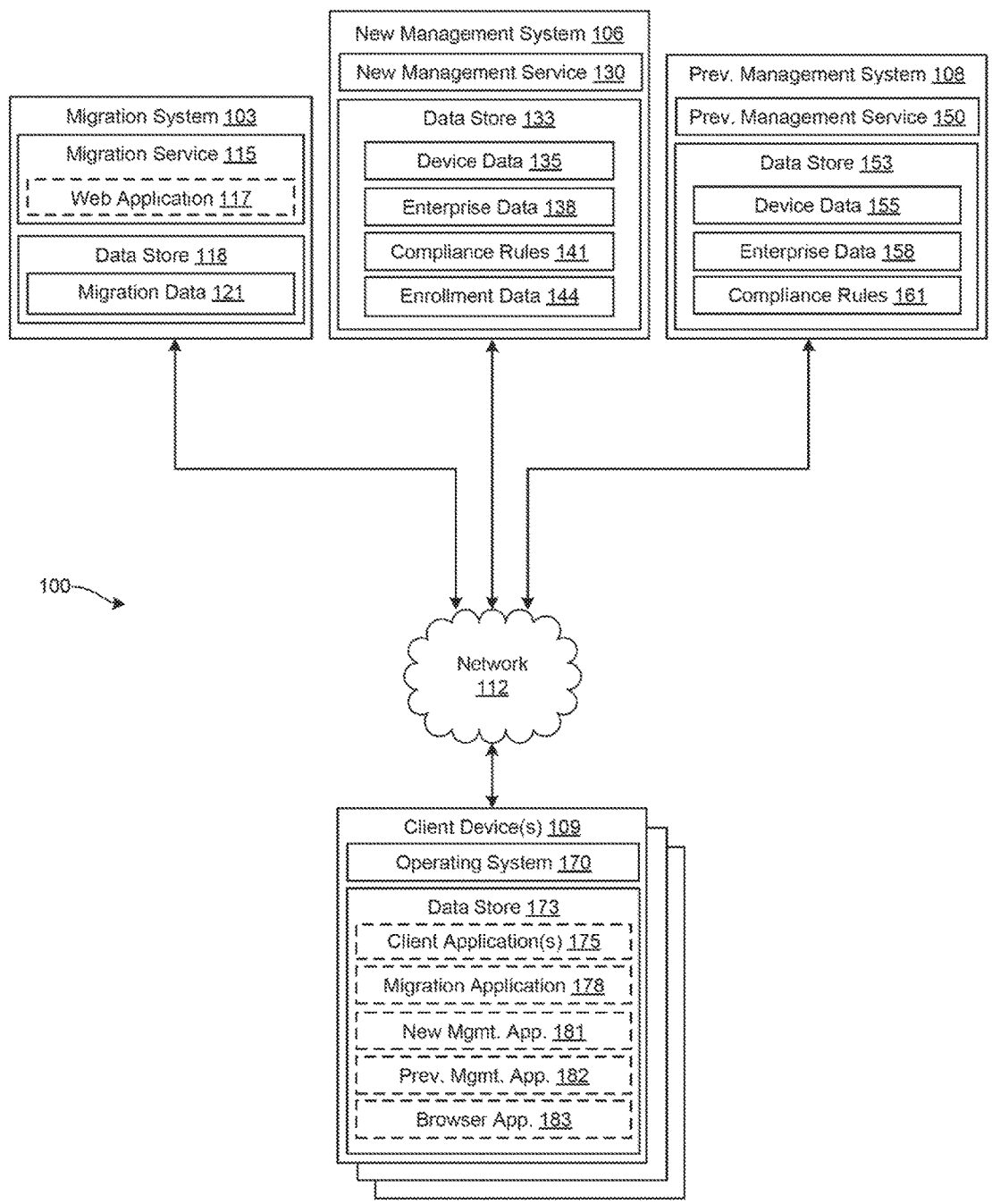
FIG. 1 is a drawing of an example of a networked environment including a migration system, a new management system, a previous management system, and a client device.

With reference to FIG. 1, shown is an example of a networked environment 100. The networked environment 100 can include a migration system 103, a new management system 106, a previous management system 108, and a client device 109 in communication with one another over a network 112. An enterprise can issue the client device 109 to a user, or the client device 109 can be provided by the user. The enterprise can change management service providers or otherwise change or migrate from the previous management system 108 to the new management system 106. In other words, the enterprise can decide to un-enroll a client device 109 from a previous management service 150 and enroll the client device 109 with a new management service 130.

The network 112 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The migration system 103 can include, for example, a server computer or any other system providing computing capability. Alternatively, the migration system 103 can include a plurality of computing devices that are arranged, for example, in one or more server banks, computer banks, or other arrangements. The migration systems 103 can include a grid computing resource or any other distributed computing arrangement. The computing devices can be located in a single installation or can be distributed among many different geographical locations. The migration systems 103 can also include or be operated as one or more virtualized computer instances. For purposes of convenience, the migration system 103 is referred to herein in the singular. Even though the migration system 103 is referred to in the singular, it is understood that a plurality of migration systems 103 can be employed in the various arrangements as described above. As the migration system 103 communicates with the client device 109 remotely over the network 112, the migration system 103 can be described as a remote migration system 103 or a collection of one or more remote computing devices.

The components executed on the migration system 103 can include, for example, a migration service 115 as well as other applications, services, processes, systems, engines, or functionality not discussed in detail herein. The migration service 115 can oversee the migration of client device 109. In some instances, the migration service 115 can include a web application 117 that can be accessed by the client device 109 through the network 112 to perform functionality related to migration between management services. The migration service 115, the web application 117, and instructions for other functionality can in some instances be stored in a data store 118 of the migration system 103. The data store 118 can include memory of the migration system 103, mass storage resources of the migration system 103, or any other storage resources on which data can be stored by the migration system 103.

The data stored in the data store 118 can be associated with the operation of the various applications and/or functional entities described below. The data store 118 can also store migration data 121 for use in migrating the client device 109 from the previous management system 108 to the new management system 106. The migration data 121 can include a list or table of client devices 109 to migrate and user data related to users of the client devices 109. The client devices 109 can be identified within the migration data 121 by a device identifier, a unique device identifier (UDID), a media access control (MAC) address, an internet protocol (IP) address, or another identifier that uniquely identifies a client device 109 with respect to other client devices 109. The migration data 121 can also identify user information such as a name (e.g., first name and last name), a username, and/or an email address. The migration data 121 can also identify a previous management service 150 from which to un-enroll each client device 109 and can include a server address of the previous management service 150. The migration data 121 can also identify a new management service 130 with which to enroll each client device 109 and can include a server address of the new management service 130. User groups employed by a management service can also be used in migration such that one user group is marked for migration to the new management service 130 while another user group is not. In some cases, the old management service 150 and the new management service 130 can be two different versions of the same management service provider.

For each client device 109, the migration service 115 can also query the previous management service 150 for device data 155, enterprise data 158, compliance rules 161, settings, user groups, and other management data associated with the client device 109. For example, the migration service 115 can utilize APIs to read and create profiles, or read and create organization groups. Such management data can be stored by the migration service 115, for example, in a temporary device record in the migration data 121. The migration service 115 can transmit the management data to the new management service 130. The new management service 130 can store such management data associated with the client device 109 in the device data 135, enterprise data 138, compliance rules 141, or otherwise in the data store 133.

In some cases, the migration service 115 can be a part of a management service, and in other cases the migration service 115 can be implemented as logic or an application that is separate from a management service. The migration data 121 can be obtained from an enterprise associated with the client devices 109. In some cases, migration data 121 can include data obtained or requested from one or more previous management services 150 with which client devices 109 are currently enrolled, or can include data received from the client device 109. A file encoding a list or a table including the migration data 121 can be obtained from the previous management service 150 and can be provided to the migration service 115. In one example, an IT administrator of the enterprise can obtain the file from the previous management service 150, and can input or upload the file including the migration data 121 through a user interface of a network site provided by the migration service 115.

The migration service 115 can facilitate a migration of a client device 109 from the previous management service 150 to the new management service 130 that is initiated by a user of the client device 109. The migration service 115 can identify a user request to migrate the client device 109, which can be input through a user interface of the web application 117. Alternatively, the user indication can be received from an application running on the client device 109. Once the migration is initiated, the migration service 115 can perform actions to un-enroll the client device 109 from the previous management service 150 and can enroll the client device 109 with the new management service 130. The migration service 115 can utilize the migration data 121 including the device identifier of the client device 109 in the migration process.

The migration service 115 can also store, in the data store 118, migration status information for each client device 109 to be migrated. For example, the migration service 115 can indicate for each client device 109 one or more steps in the migration process that are completed, such as whether migration is initiated, whether the client device is un-enrolled from the previous management service 150, and whether migration is completed. A timestamp can indicate when each step in the process is completed. The migration status information for each client device 109 can be used to provide statistical information about a subset of the client devices 109 associated with an enterprise. The migration status information for each client device 109 and statistical information can be provided to an enterprise managing the client devices 109, for example, using notifications through email, text, other messaging services, network sites, or applications. The migration service 115 can notify the enterprise that a percentage of the client devices 109 managed by the enterprise have completed migration, further identifying the client devices 109 that have not completed migration, or indicate which management service the client devices 109 is currently enrolled with.

For example, the migration service 115 can provide a network site for administration of the migration of a set of client devices 109 from the previous management service 150 to the new management service 130. Such a network site can provide administrative access to the migration status information for each of the client devices 109, along with user identifiers, email addresses, device identifiers, enrollment statuses. A user interface of the network site can facilitate input or upload of a file including the migration data 121 through the network site provided by the migration service 115. Also, the user interface can provide a button or user interface element that can, once activated, send a message to a user of a client device 109. The message can include a unique link that facilitates migration of each client device 109. Another user interface element can, when activated, cause the client device 109 to be un-enrolled from the previous management service 150 and/or be enrolled with the new management service 130 through the migration service 115.

The migration service 115 can also use the information to provide reminders or notifications to a user of each client device 109. For example, an enterprise can request that the migration service 115 send reminders to client devices 109 that have not completed migration by a certain date, after a determined time has passed, periodically, or on another schedule. Notifications or reminders to client devices 109 and users can also be sent messages by emails, texts, network sites, or applications.

The new management system 106 executes a new management service 130 to oversee the management of the client devices 109. The components executed on the new management system 106 can include, for example, a new management service 130 as well as other applications, services, processes, systems, engines, or functionality not discussed in detail herein. The new management service 130 can provide functionality using application program interfaces (APIs). The new management service 130 can oversee the operation of client devices 109 enrolled with the new management service 130 as well as manage enrollment and un-enrollment operations of the client devices 109. To this end, an API of the new management service 130 can provide enrollment information regarding a client device 109, such as whether the client device 109 is enrolled with the new management service 130. APIs or API calls can be provided for other functionalities of the new management service as discussed herein.

In some embodiments, an enterprise, such as one or more companies or other organizations, can operate the new management service 130 to oversee or manage the operation of the client devices 109 of its employees, contractors, customers, students, or other users having user accounts with the enterprise. An enterprise can be any customer of the new management service 130.

The data store 133 can include memory of the new management system 106, mass storage resources of the new management system 106, or any other storage resources on which data can be stored by the new management system 106. The data stored in the data store 133 can include, for example, management data including device data 135, enterprise data 138, compliance rules 141, and enrollment data 144, as well as other data.

Generally, device data 135 includes data associated with a configuration of a client device 109 enrolled or managed by the new management service 130 and can include an identifier of the client device 109. The identifier can be a serial number, media access control (MAC) address, other network address, or another device identifier. In addition, the device data 135 can include an enrollment status indicating whether a client device 109 has been enrolled with the new management service 130. In one example, a client device 109 designated as "enrolled" can be permitted to access the enterprise data 138 while a client device 109 designated as "not enrolled," or having no designation, can be denied access to the enterprise data 138.

Additionally, device data 135 can include indications of the state of the client device 109. In one example, these indications can specify applications that are installed on the client device 109, configurations or settings that are applied to the client device 109, user accounts associated with the client device 109, the physical location of the client device 109, the network to which the client device 109 is connected, and other information describing the current state of the client device 109.

Further, device data 135 can also include data pertaining to user groups. An administrator can specify one or more of the client devices 109 as belonging to a user group. User groups can be created by an administrator of the new management service 130 such that a batch of client devices 109 can be configured according to common settings. For instance, an enterprise can create a user group for the marketing department and the sales department, where the client devices 109 in the marketing department are configured differently from the client devices 109 in the sales department.

Compliance rules 141 can include, for example, configurable criteria that must be satisfied for an enrolled one of the client devices 109 to be "in compliance" with the new management service 130. The compliance rules can be based on a number of factors including geographical location of the client device 109, activation status, enrollment status, authentication data including authentication data obtained by a device registration system, time, and date, and network properties, among other factors. The compliance rules can also be determined based on a user profile associated with a user. The user profile can be identified by obtaining authentication data associated with the client device 109. The user profile can be associated with compliance rules that are further determined based on time, date, geographical location and network properties detected by the client device 109. The user profile can further be associated with a user group, and compliance rules can be determined in view of the user group.

Compliance rules 141 can include predefined constraints that must be met in order for the new management service 130, or other applications, to permit access to the enterprise data 138 or other features of the client device 109. In some examples, the new management service 130 communicates with a management application, a migration application, or another client application 175 executable on the client device 109 to determine whether states exist on the client device 109 that do not satisfy one or more compliance rules 141. Some of these states can include, for example, a virus or malware being detected on the client device 109; installation or execution of a blacklisted client application 175; a client device 109 being "rooted" or "jailbroken," where root access is provided to a user of the client device 109. Additional states can include the presence of particular files, questionable device configurations, vulnerable versions of client applications 175, or other vulnerability, as can be appreciated. In some examples, the compliance rules 141 can be received from the migration service 115, and can be based on the compliance rules 161 of the previous management service 150. In other examples, the compliance rules 141 can be configured in the new management service 130 as specified by an administrator.

Enrollment data 144 can include information that can be used to enroll a client device 109 with the new management service 130. Enrollment data 144 can also include a network address or other information to facilitate communication between the client device 109 and the new management service 130. Further, the enrollment data 144 can include an enrollment link, or a link to a network site that allows the client device 109 to enroll with the new management service 130. Enrollment data 144 can also include a network resource address and other instructions for communications with the new management service 130, for example, to utilize an API of the new management service 130. To this end, the new management service 130 can include the network site and generate a link to the network site to include in the enrollment data 144.

The enrollment data 144 can include an enrollment token such as a value, parameter, or file that can be used to authenticate the client device 109 with the new management service 130. An enrollment token can be included in a link for enrollment. In some cases, the new management service 130 can distribute enrollment tokens corresponding to each of the client devices 109 and/or users. To this end, a request for an enrollment token can be required to include a device identifier, username, password, or other information. While the enrollment token can be used to enroll the client device 109, in some cases it can be requested from another device, such as the migration system 103. An enrollment token can be valid during a certain time period after which the enrollment token can expire. The enrollment data 144 can be considered part of the compliance rules 141 and can be determined based on device identifier, time, date, geographical location and network properties like the compliance rules 141.

In some embodiments, an enterprise can operate the new management service 130 to oversee or manage the operation of the client devices 109 of its employees, contractors, customers, students, or other users having user accounts with the enterprise. The new management service 130 can remotely configure the client device 109 by interacting with an agent application, a migration application 178, a new management application 181, or another client application 175 executed on the client device 109.

The new management service 130 can transmit various software components to the client device 109 which are then installed or configured by the new management application 181. Such software components can include, for example, additional client applications 175, resources, libraries, drivers, device configurations, or other similar components that require installation on the client device 109 as specified by an administrator of the new management service 130. The new management service 130 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the new management application 181.

The new management service 130 can have a command queue storing at least one action to perform on the particular client device 109 upon check-in of the client device 109. For instance, the new management application 181 can cause the client device 109 to check-in with the new management service, identify an action in the command queue, and perform the action. An action can be the installation of a profile, or the execution of a command or other actions to install software components or implement policies. In some cases, the new management application 181 can cause a check-in of the client device 109 periodically, on a schedule, or upon an event such as entering a physical location, changing a state of the client device 109, or installing an application on the client device 109. In one example, the contents of the command queue can include a command that the management application 181 causes to be executed on the client device 109. In another example, the contents of the command queue can include a resource or a client application 175 that the management application 181 causes to be installed on the client device 109, which the client device 109 may access through a specified uniform resource locator (URL).

Also, the new management service 130 can request that the client device 109 check-in using a notification service like APPLE® Push Notification Service (APNS), GOOGLE® Cloud Messaging (GCM), or WINDOWS® Push Notification Services (WNS). For example, the new management service 130 can transmit a request to the notification service requesting that the client device 109 check-in. The notification service can push or otherwise route a notification to the client device 109. Once the notification is received, the new management application 181 can cause the client device 109 to check-in with the new management service 130. As described above, the new management application 181 can determine whether a command queue provided by the new management service 130 for the respective client device 109 contains any commands or resources for the client device 109, and, if so, can cause the commands or resources to be downloaded and/or implemented on the client device 109.

The previous management system 108 can be a system similar in respects to the new management system 106. The previous management system 108 executes a previous management service 150 to oversee the management of the client devices 109. To this end, the previous management system 108 can have a command queue and can interact with the client device 109 through a previous management application 182. For instance, the previous management application 182 can install profiles, execute commands, implement policies, and can perform other actions on the client device 109. Such actions can be retrieved from the command queue of the previous management system 108 upon check-in of the client device 109. In some embodiments, an enterprise, such as one or more companies or other organizations, can operate the previous management service 150 as discussed for the new management service 130.

The previous management system 108 can have a data store 153 storing management data including device data 155, enterprise data 158, and compliance rules 161, as well as other data. The form and function of the device data 155, enterprise data 158, and compliance rules 161 can be similar in type to the device data 135, enterprise data 138, and compliance rules 141 described with respect to the previous management system 108. The functionalities provided by the previous management system 108 can also be similar in respects to those discussed for the new management system 106. The specific data sets, can differ, for example, if different client devices 109 are managed by each management system, if different entities employ each management system, etc. The previous management service 150 can also provide APIs for functionalities of the previous management service 150.

For example, the previous management service 150 can un-enroll the client device 109 from the previous management service 150 upon receiving a request including a device identifier that is associated with a client device 109. Un-enrollment requests can also be required to include a username, password, or other data associated with the client device 109 to initiate un-enrollment. Once un-enrollment is initiated, the previous management service 150 can send a command or otherwise require that the client device 109 perform un-enrollment requirements that can be defined in the compliance rules 161. Un-enrollment requirements can include deleting or removing access to data or functionalities from the client device 109 including client applications 175, enterprise data, or other data and functionalities associated with a particular enterprise or the previous management service 150 (e.g., enterprise wipe). Un-enrollment can be performed by removing a management profile associated with the previous management service 150 from the client device 109. For example, when the client device 109 checks in with the previous management service 150, the previous management service 150 can respond with a command or a response (e.g., 401, or enterprise wipe) that causes the client device 109 to remove a management profile associated with the previous management service 150.

The client device 109 can be representative of one or more client devices 109. The client device 109 can include a processor-based system, such as a computer system, that can include a desktop computer, a laptop computer, a personal digital assistant, a cellular telephone, a smartphone a set-top step, a music player, a tablet computer system, a game console, an electronic book reader, a smartwatch, or any other device with like capability. The client device 109 can have an operating system 170 that can perform functionalities and execute applications. The operating system 170 can be stored in a data store 173 that also includes client applications 175, a migration application 178, and other data. In addition, the client device 109 can execute the migration application 178 to perform the migration functionality described for the migration system 103, and can have migration data 121 stored in its data store 173 to facilitate such functionality.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another.

The operating system 170 can be configured to execute various client applications 175, such as a migration application 178, the new management application 181, the previous management application 182, a browser application 183, or another application. The operating system 170 and some client applications 175 can access network content served up by the migration system 103, the new management system 106, the previous management system 108, or other servers, thereby rendering a user interface on a display, such as a liquid crystal display (LCD), organic light emitting diode (OLED) display, touch-screen display, or other type of display device.

To this end, some client applications 175 can include a browser or a dedicated application, and a user interface can include a network page, an application screen, or other interface. The client device 109 can also access web applications, such as the web application 117 of the migration service 115, by using the browser application 183 that can access the web application 117 or other web application through the network 112 which can render a user interlace associated with the web application 117 on the client device 109. Further, other client applications 175 can include device management applications, enterprise applications, social networking applications, word processors, spreadsheet applications, media player applications, or other applications.

The migration application 178 can be an application that performs certain functions in the migration of the client device 109 from the previous management service 150 to the new management service 130. The migration application 178 can identify a user request to migrate the client device 109 from the previous management service 150 to the new management service 130. The migration application 178 can notify the migration service 115 and can perform other actions of the migration in conjunction with the migration service 115. This can simplify the process for the user and the enterprise associated with the client device 109.

The migration applications 178 can also update a user interface rendered by the migration application 178 to provide notifications related to the migration progress. For example, a notification can be generated for un-enrollment from the previous management service 150, obtaining enrollment data from the new management service 130, enrollment with the new management service 130, completion of the migration process, and other indications of migration status information.

The migration application 178 can also generate prompts in a user interface through which required information such as a username or password can be received or input. In other situations, the migration application 178 or the migration service 115 can obtain the required information from another source, such as from the enterprise, from the new management service 130, the previous management service 150, or another source. In some implementations, all of the functionalities of the migration service 115 can be performed by the migration application 178 on the client device 109.

The migration application 178 can identify a device identifier of the client device 109 when needed for the migration process. The migration application 178 can search information in the data store 173 to identify system information associated with the client device 109 that can be used to identity the device identifier of the client device 109. For example, the migration application 178 can search the data store 173 and identify a serial number or other device identifier of the client device 109. The migration application 178 can further search the data store 173 to identify a user identifier, a credential, an email address, or an identity of an enterprise.

The migration application 178 can also enable features or functionalities of the client device 109. For example, the migration application 178 can enable a network adapter such as a WiFi adapter or 802.11 device to facilitate identifying a MAC address associated with the client device 109. In some examples, a MAC address of a client device 109 might be unavailable unless the network adapter has been enabled, in such a scenario, the migration application 178 can cause the client device 109 to enable the network adapter and identify a MAC address, IP address, or other device identifier.

The migration application 178 can store data such as the migration data 121 on the data store 173. In some instances, the migration application 178 can obtain or receive migration data 121 from the migration service 115 or enrollment data 144 from the new management service 130. In further examples, the migration application 178 already includes migration data when it is installed. In some cases, the migration application 178 does not need to be installed on the client device 109 in order to perform migration functionalities on the client device 109. In such instances, functionalities provided by the migration application 178 can be performed by a web application 117 accessed through a browser application 183 of the client device 109, without the need for the migration application 178 to be installed on the client device 109.

Figure 2:
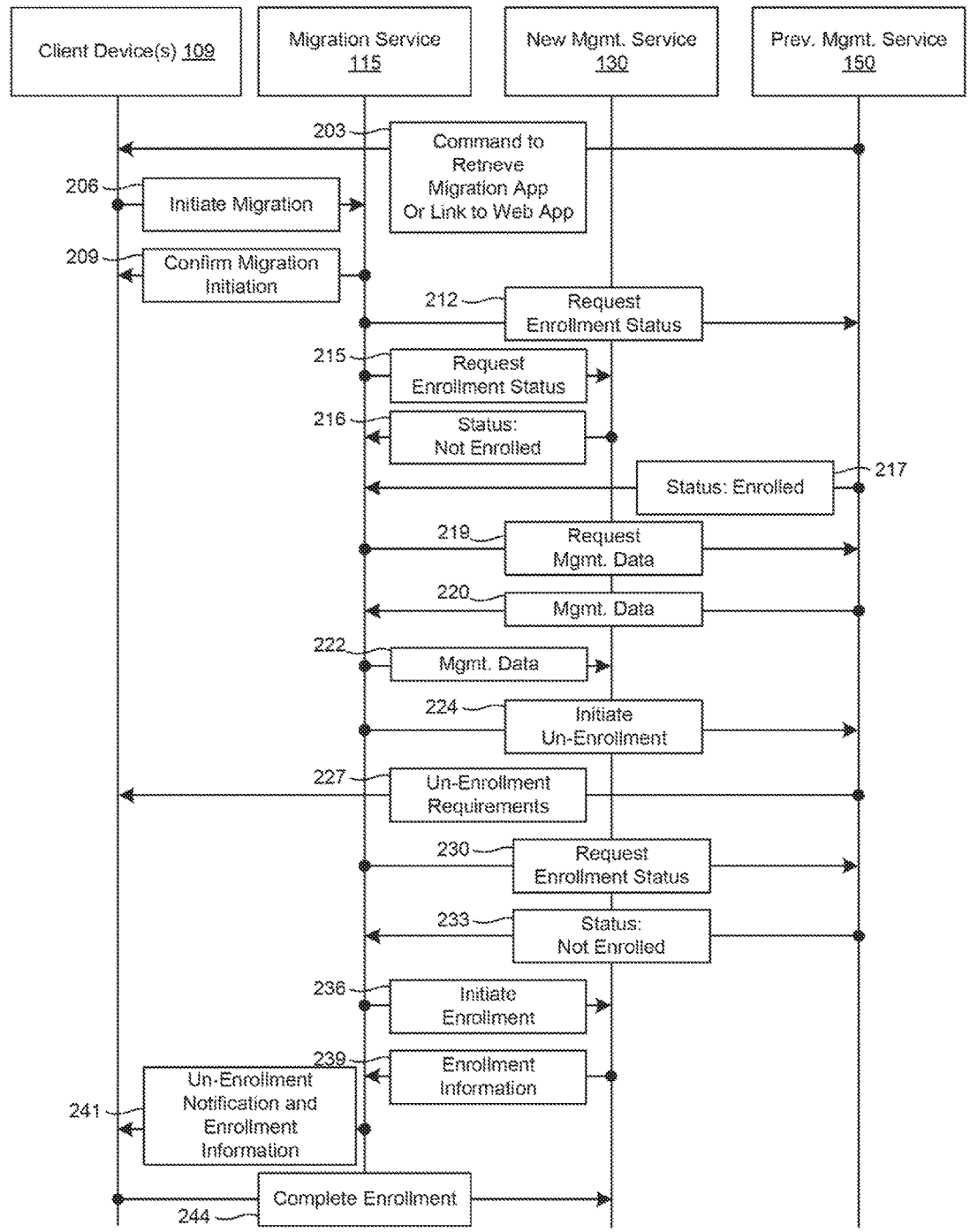
FIGS. 2-3 are sequence diagrams illustrating functionality implemented by components of the networked environment.

Turning now to FIG. 2, shown is a sequence diagram illustrating steps performed by components of the networked environment 100 for migrating the client device 109 from the previous management service 150 to the new management service 130. Generally, the migration process shown in FIG. 2 involves un-enrolling the client device 109 from the previous management service 150 and enrolling it with the new management service 130 through the migration service 115. In some examples, the migration service 115 is used in concert with the migration application 178 for user interaction and migration actions performed on the client device 109. In other examples, the browser application 183 can access the web application 117 and can be used instead of the migration application 178 to perform migration actions on the client device 109.

Starting with sup 203, the previous management service 150 can cause the migration application 178 to be installed on the client device 109. The previous management service ISO can have instructions in its command queue to download and install the migration application 178. Once the client device 109 checks-in with the previous management service 150, the previous management application 182 can implement the instructions in the command queue. For example, the command queue of the previous management service 150 can include a download command with a URL from which the migration application 178 can be accessed. The previous management application 182 can execute the download command, causing the client device 109 to download the migration application 178 using the URL. The previous management application 182 can also implement an install command in the command queue of the previous management service 150 to install the migration application 178 on the client device 109. Alternatively, a link to obtain the migration application 178 can be sent to the user of the client device 109 from the migration service 115, and the user can initiate the download and/or installation of the migration application 178 on the client device 109.

Once installed, the migration application 178 can be configured to obtain a migration initiation directive, command, or input on the client device 109. The migration application 178 can also display status updates during the migration process. Status updates can include a notification that migration has started, a notification of un-enrollment from the previous management service 150, and/or a notification of enrollment with the new management service 130. The migration application 178 can also include a progress bar or other visualization aid to provide status information about the migration operation. In some examples, the migration application 178 and the migration service 115 can provide for "one touch" migration, requiring no further interaction at the client device 109 once migration is requested by a user through the migration application 178.

In other examples, a link to a web application, such as the web application 117, can be accessed by the client device 109 through the browser application 183. The link can be sent by the previous management service 150 or the migration service 115. The link can be sent through email, text, instant message, an application notification, or any other messaging service or protocol. The browser application 183 or another client application 175 can render a user interface of the web application 117 on the client device 109. The browser application 183 or the other client application 175 can access the web application 117 and can perform functionality similar to that described for the migration application 178 for migrating the client device 109 from the previous management service 150 to the new management service 130.

At step 206, the client device 109 initiates migration of the client device 109 from the previous management service 150 to the new management service 130. For example, migration can be initiated when a button or link in the migration application 178 or the web application 117 is activated. Upon a request to initiate migration, the request or an indication of such can be sent to the migration service 115. Once the request to initiate migration is received by the migration service 115, the migration service 115 can perform the migration of the client device 109 from the previous management service 150 to the new management service 130. Alternatively, migration can be initiated once a button or user interface element is activated on a network site provided for administration of the migration service 115.

As shown in step 209, the migration service 115 can confirm that migration is initiated and is in progress. The migration service 115 can send this confirmation to the client device 109 by updating a user interface of the migration application 178 or the web application 117 to display a notification or update and visualize the progression of the migration on the client device 109.

In step 212, the migration service 115 can send a request for an enrollment status of the client device 109 to the previous management service 150. For instance, the previous management service 150 can provide an API that facilitates an enrollment status request that identifies whether a client device 109 is enrolled with the previous management service 150. The migration service 115 can invoke the API or otherwise send a request for the enrollment status of the client device 109 to the previous management service 150. The request can include a MAC address, an IP address, a serial number, a UDID, user credentials, an identity of an enterprise managing the client device 109, and other migration data.

In step 215, the migration service 115 can send another request for an enrollment status of the client device 109 to the new management service 130. The new management service 130 can have an API that facilitates an enrollment status request as discussed with respect to the previous management service 150. The migration service 115 can invoke the API or otherwise send a request for the enrollment status of the client device 109 to the new management service 130.

The requests can be performed simultaneously or sequentially in any order. For example, the migration service 115 can send a request for an enrollment status from the new management service 130. When the status is received, or after a certain time has elapsed, the migration service 115 can send a request for an enrollment status to the previous management service 150. In some cases one or both of the enrollment status requests are not performed. For example, the enrollment status of the client device 109 with the new management service 130 and/or the previous management service 150 can be determined based on management profiles or other data stored on the client device 109, or can be identified in the migration data 121, and status verification can be considered unnecessary.

In step 216, the new management service 130 can transmit to the migration service 115 an indication of the enrollment status of the client device 109 with the new management service 130. In this example, the new management service 130 can indicate that the client device 109 is currently not enrolled with the new management service 130. The migration service 115 can store the enrollment status of the client device 109 with the new management service 130 in a temporary device record or otherwise in the data store 118 of the migration service 115.

In step 217, the previous management service 150 can transmit to the migration service 115 an indication of the enrollment status of the client device 109 with the previous management service 150. In this example, the previous management service 150 can transmit that the client device 109 is currently enrolled with the previous management service 150. The migration service 115 can store the enrollment status of the client device 109 with the previous management service 150 in the temporary device record or otherwise in the data store 118 of the migration service 115.

In step 219, the migration service 115 can transmit a request to the previous management service 150 for management data associated with the client device 109. The requested management data can include device data 155, enterprise data 158, compliance rules 161, settings, user groups, and other management data.

In step 220, the previous management service 150 can transmit the management data to the migration service 115. The migration service 115 can store such management data in a temporary device record for the client device 109, or otherwise in the migration data 121.

In step 222, the migration service 115 can transmit the management data to the new management service 130. The new management service 130 can store the management data in association with the client device 109 in the device data 135, enterprise data 138, compliance rules 141, or otherwise in the data store 133.

In step 224, the migration service 115 can initiate un-enrollment of the client device 109 from the previous management service 150. In some cases, this can include sending a request to un-enroll the client device 109 from the previous management service 150 by invoking or calling an API of the previous management service 150. In other embodiments, the migration service 115 can cause the migration application 178 to send the request to un-enroll from the client device 109. A request to un-enroll the client device 109 can include a MAC address, an IP address, a serial number, a UDID, user credentials, an identity of an enterprise managing the client device 109, administrator credentials, and other migration data. For example, administrator credentials can be required to authenticate with an API of the previous management service 150 to prove that the request is valid. The device identifier of the client device 109 transmitted in the request to un-enroll from the previous management service 150 can include a MAC address, an IP address, a serial number, or another identifier that facilitates identification of the client device 109.

The migration data 121 used by the migration service 115 during the migration can be obtained by the migration service 115 from the client device 109. For instance, the migration application 178 can determine a MAC address of a network adapter of the client device 109, and send the MAC address to the migration service 115 as a device identifier.

In step 227, the previous management service 150 can cause un-enrollment commands or requirements to be implemented on the client device 109. The previous management service 150 can manage the client device 109 until un-enrolled. The previous management service 150 can employ the previous management application 182 or another client application 175 to perform actions on the client device 109 that are retrieved upon checking in with the previous management service 150. For example, the previous management service 150 can store in its command queue a command to remove the management profile from the client device 109. Upon check-in, the previous management application 182 can identify the action and remove the management profile from the client device 109, completing the un-enrollment. In some cases the previous management service 150 can use a notification service to request that the client device 109 check-in with the previous management service 150. The un-enrollment requirements can also include a number of other actions for the client device 109 to perform, such as uninstallation of client applications 175 related to the previous management service 150, removal of enterprise data, and removal of management data (e.g., enterprise wipe). In some cases the client device 109 can transmit an indication of completion of such actions to the migration service 115 and/or the previous management service 150. For example, the operating system 170 can remove client applications 175, the management application 182, enterprise data, settings and configurations, and the operating system 170 can transmit a message that indicates the un-enrollment is complete. In other examples, the management application 182 can remove client applications 175, enterprise data, settings and configurations, and can transmit an indication of completion of such actions before un-installing itself.

In step 230, the migration service 115 can request the enrollment status of the client device 109 with the previous management service 150 or can otherwise determine whether the un-enrollment from the previous management service 150 is complete. For example, the migration service 115 can query the previous management service 150 for the enrollment status of the client device 109 with the previous management service 150 and can determine that the un-enrollment is complete once the previous management service 150 transmits to the migration service 115 an indication that the client device 109 is not enrolled. Alternatively, the migration service 115 can determine that un-enrollment of the client device 109 from the previous management service 150 is complete when the client device 109 transmits an indication that the management profile associated with the previous management service 150 is removed from the client device 109.

In step 233, the previous management service can transmit to the migration service 115 an indication that the client device 109 is not enrolled with the previous management service 150 or otherwise indicates that the un-enrollment of the client device 109 is complete. For example, the previous management service 150 can respond to a request from the migration service 115 indicating that the client device 109 is not enrolled with the previous management service 150. In some cases, the previous management service 150 can send confirmation to the client device 109 that the un-enrollment process is complete, and the migration application 178 can notify the migration service 115.

At step 236, the migration service 115 can initiate enrollment of the client device 109 with the new management service 130. A request to enroll the client device 109 with the new management service 130 can be sent by the migration service 115. In other embodiments, the migration service 115 can cause the client device 109 to send the request to enroll the client device 109 with the new management service 130. The request can include device data such as a device identifier of the client device 109, as well as user credentials associated with a user of the client device 109.

As shown in step 239, the new management service 130 can send enrollment information 10 the migration service 115. The enrollment information, or enrollment data 144, can include an enrollment token for enrollment with the new management service or a link to a network site that facilitates enrollment, where the link includes a token or parameter that uniquely identifies and/or authenticates the client device 109. Enrollment information can also include a network resource address and instructions to utilize an API or another resource of the new management service 130.

In step 241, the migration service 115 can send a notification to the client device 109 that the un-enrollment from the previous management service 150 is complete. Further, the migration service 115 can send the enrollment information to the client device 109 to facilitate enrollment with the new management service 130. For example, the migration service 115 can send the enrollment token or other enrollment data 144 to the client device 109 through the migration application 178, the web application 117, email, text message, or push notification.

As shown in step 244, the client device 109 can complete enrollment with the new management service 130. For example, once the enrollment token is received, the migration application 178 can transmit to the new management service the device identifier and/or the enrollment token to identify and/or authenticate the client device 109 with the new management service 130. For example, the migration application 178 can access a URL that incorporates the enrollment token for identification or authentication of the client device 109. Alternatively, the migration application 178 can access a URL and cause the client device 109 to input the enrollment token into a user interface rendered on a display of the client device 109 by the migration application 178, the browser application 183, or another client application 175. In some cases, the migration application 178 can display the enrollment token to a user, and the user can input the enrollment token into the user interface.

In other examples, the enrollment data can include a link to a network site that facilitates enrollment with the new management service 130, where the link includes a token or parameter that uniquely identifies and/or authenticates the client device 109. The link can be utilized by the migration application 178 or the web application 117 to cause the client device 109 to display the network site, where enrollment can be completed by the user by entering user credentials and accepting a terms of service. The migration application 178 or the web application 117 can render a user interface with a notification that the migration is complete.

The migration service 115 can also cause the new management application 181 to be installed on the client device 109. In some cases, this can be performed through the network site that can be displayed as described in step 244. Alternatively, the migration application 178 can be the new management application 181. Once the new management application 181 is installed, profiles, policies, commands, and other actions can be implemented on the client device 109 using the command queue of the new management service 130 in concert with the new management application 181. The profiles, policies, and settings applied to the client device 109 through the new management service 130 can be based on the management data (e.g., from the previous management service 150) in association with the client device 109 in the device data 135, enterprise data 138, and compliance rules 141. A new management profile associated with the new management service 130 can be installed on the client device 109 to complete the enrollment.

The client device 109 can be assigned to one or more user groups initially upon enrollment with the new management service 130, based on the management data in association with the client device 109 in the device data 135, enterprise data 138, and compliance rules 141. Alternatively, once the client device 109 is enrolled, the new management application 181 can check-in and the new management service 130 can detect criteria associated with the client device 109 such as a geolocation, a device identifier, a user identifier, and a network connection. Based on such criteria, the new management service 130 can apply appropriate user group settings, policies, and profiles through the command queue.

In some cases, the previous management service 150 may not support un-enrollment requests. In that situation, the previous management service 150 can configures a global proxy on the client device 109. The previous management application 182 can implement the global proxy on the client device as directed through the command queue of the previous management service 150. The global proxy causes all network transmissions from the client device 109 to be directed through a specified proxy server or gateway. Network transmissions from the client device 109 that are intended for the previous management service 150 can be detected by identifying a specified URL (e.g., a URL for the previous management service 150) that is being directed through the proxy server. Such network transmissions from the client device 109 are redirected to an emulated management service that can emulate the previous management service 150 an emulated SSL certificate and that supports un-enrollment requests. The previous management service 150 can cause a root certificate for the emulated SSL certificate to be applied at the client device 109 through the previous management application 182. This root certificate can cause the client device 109 to trust the emulated SSL certificate of the emulated management service. Once an un-enrollment request to un-enroll the client device 109 is detected and redirected to the emulated management service, the emulated management service can respond with an un-enrollment command that can be implemented by the client device 109 though the previous management application 182. In some cases, the migration service 115 can control the previous management service 150 through screen-scraping and emulation of administrator control (e.g., through emulated mouse and keyboard control) through a network site of the previous management service 150.

Figure 3:
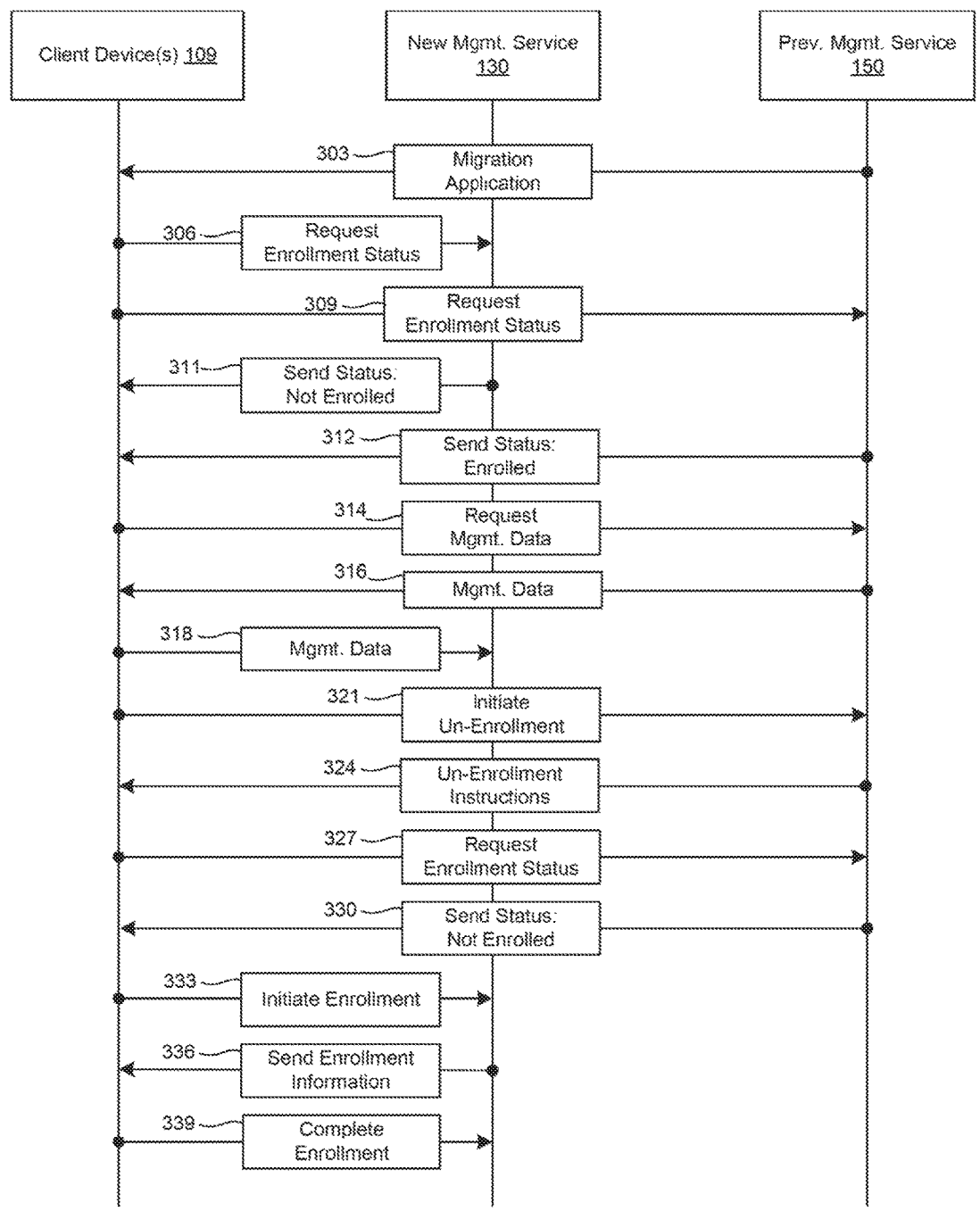

With reference to FIG. 3, shown is another sequence diagram illustrating steps performed by components of the networked environment 100 for migrating the client device 109 from the previous management service 150 to the new management service 130. Generally, the process shown in FIG. 3 involves un-enrolling the client device 109 from the previous management service 150 and enrolling it in the new management service 130 using a migration application 178. In some examples, a migration service 115 is not utilized.

Starting with step 303, the previous management service 150 can cause the client device 109 to install the migration application 178. For example, an enterprise managing the client device 109 can currently employ the previous management service 150 for management services. The previous management service 150 can have instructions in its command queue to install the migration application 178. Once the client device 109 checks-in with the previous management service 150, the previous management application 182 can implement the instructions in the command queue. For example, the command queue of the previous management service 150 can include an install command with a URL from which the migration application 178 can be accessed. The previous management application 182 can execute the install command, causing the client device 109 to download the migration application 178 using the URL and installing the migration application 178 on the client device 109. In some cases the previous management service 150 can use a notification service to request that the client device 109 check-in, and the notification service can push or otherwise route a notification to the client device 109 that causes the client device 109 to check-in with the previous management service 150. Alternatively, a link to obtain the migration application 178 can be sent to the client device 109 through email or a messaging service by the enterprise, the migration application 178, the new management service 130, or the previous management service 150.

In step 306, the migration application 178 can be executed and can send to the previous management service 150 a request for an enrollment status of the client device 109. The migration application 178 can invoke an API or otherwise send to the management service 150 a request for the enrollment status of the client device 109. The request can include a MAC address, an IP address, a serial number, a UDID, user credentials, an identity of an enterprise managing the client device 109, and other data.

In step 309, the migration application 178 can send to the new management service 130 another request for an enrollment status of the client device 109. The migration application 178 can invoke an API or otherwise send, to the new management service 130, a request for the enrollment status of the client device 109.

The enrollment status request that is sent to the previous management service 150 and the enrollment status request that is sent to the new management service 130 can be performed simultaneously or sequentially. In some implementations, the enrollment status request that is sent to the previous management service 150, and/or the enrollment status request that is sent to the new management service 130 can be omitted.

In step 311, the new management service 130 can transmit to the migration application 178 an indication of the enrollment status of the client device 109 with the new management service 130. In this example, the new management service 130 can transmit that the client device 109 is currently not enrolled with the new management service 130. Where the migration service 115 is utilized, the enrollment status of the client device 109 with the new management service 130 can be transmitted from the client device 109 to the migration service 115 and stored in a temporary device record associated with the client device 109, or otherwise in the data store 118. Where the migration service 115 is not utilized, the enrollment status of the client device 109 with the new management service 130 can be stored in the data store 173 of the client device 109.

In step 312, the previous management service 150 can transmit to the migration application 178 an indication of the enrollment status of the client device 109 with the previous management service. In this example, the previous management service 150 can transmit that the client device 109 is currently enrolled with the previous management service 150. Where the migration service 115 is utilized, the enrollment status of the client device 109 with the previous management service 150 can be transmitted from the client device 109 to the migration service 115 and stored in a temporary device record or otherwise in the data store 118. Where the migration service 115 is not utilized, the enrollment status of the client device 109 with the previous management service 150 can be stored in the data store 173 of the client device 109.

In step 314, the migration application 178 can transmit a request to the previous management service 150 for management data associated with the client device 109. The requested management data can include device data 155, enterprise data 158, compliance rules 161, settings, user groups, and other management data.

In step 316, the previous management service 150 can transmit the management data to the migration application 178. The migration application 178 can store in the data store 173 management data from the previous management service 150. Where the migration service 115 is utilized, the management data from the previous management service 150 can be transmitted from the client device 109 to the migration service 115 and stored in a temporary device record associated with the client device 109, or otherwise in the data store 118.

In step 318, the migration application 178 can transmit the management data to the new management service 130. The new management service 130 can store the management data in association with the client device 109 in the device data 135, enterprise data 138, compliance rules 141, or otherwise in the data store 133.

In step 321, the migration application 178 can initiate un-enrollment of the client device 109 from the previous management service 150. In some cases, this can include sending a request to un-enroll the client device 109 from the previous management service 150, for example, by invoking or calling an API of the previous management service 150. A request to un-enroll the client device 109 can include device data, such as a device identifier of the client device 109, or user data, such as user credentials or an authentication token. The device identifier of the client device 109 can include a MAC address, an IP address, a UDID, a serial number, or another identifier that uniquely identifies the client device 109 with respect to other client devices 109.

The device identifier of the client device 109 can be determined by the migration application 178. The device identifier of the client device 109 can also be obtained from the enterprise, or from the previous management service 150, and manually provided to the new management service 130. In one scenario, the client device 109 can connect to a network or enable a network adapter, and the migration application 178 can obtain the MAC address of the client device 109, which can be used as the device identifier of the client device 109.

Moving to step 324, the previous management service 150 can cause un-enrollment commands or requirements to be implemented on the client device 109. The previous management service 150 can employ the previous management application 182 to perform actions on the client device 109 that are retrieved upon checking in with the previous management service 150. For example, the previous management service 150 can store in its command queue a command to remove the management profile from the client device 109. Upon check-in, the previous management application 182 can identify the action and remove the management profile from the client device 109, completing the un-enrollment. In some cases the previous management service 150 can use a notification service to request that the client device 109 check-in with the previous management service 150. In other situations, the un-enrollment requirements can also include a number of other actions for the client device 109 to perform, such as uninstallation of client applications 175 related to the previous management service 150, removal of enterprise data, and removal of management data (e.g. enterprise wipe). In some cases the client device 109 can transmit to the previous management service 150 an indication that the un-enrollment of the client device 109 from the previous management service 150 is complete.

In step 327, the migration application 178 can request the enrollment status of the client device 109 with the previous management service 150, to confirm that the previous management service 150 acknowledges the un-enrollment of the client device 109 from the previous management service 150. For example, the migration application 178 can query the previous management service 150 for the enrollment status of the client device 109 with the previous management service 150 and can confirm that the un-enrollment is acknowledged when the previous management service 150 responds with an indication that the client device 109 is not enrolled.

In step 330, the previous management service can transmit to the migration application 178 an indication that the client device 109 is not enrolled with the previous management service 150, or otherwise indicates that the tin-enrollment of the client device 109 is complete. For example, the previous management service 150 can respond to a request from the migration application 178 indicating that the client device 109 is not enrolled with the previous management service 150. Where the migration service 115 is utilized, the enrollment status of the client device 109 with the previous management service 150 can be transmitted from the client device 109 to the migration service 115 and stored in a temporary device record or otherwise in the data store 118. Where the migration service 115 is not utilized, the enrollment status of the client device 109 with the previous management service 150 can be stored in the data store 173 of the client device 109.

At step 333, the migration application 178 can initiate enrollment of the client device 109 with the new management service 130. A request to enroll the client device 109 with the new management service 130 can be sent by the migration application 178. The request can include a MAC address, an IP address, a serial number, a UDID, user credentials, an identity of an enterprise managing the client device 109, and other data. In some cases, the migration application 178 can transmit the management data (e.g., from the previous management service 150) to the new management service 130 along with the request to enroll. The new management service 130 can store the management data in association with the client device 109 in the device data 135, enterprise data 138, compliance rules 141, or otherwise in the data store 133.

As shown in step 336, the new management service 130 can send enrollment information to the migration application 178. The enrollment information can include an enrollment token for enrollment with the new management service, a link to a network site that facilitates enrollment, and further enrollment data 144. An enrollment token can be a parameter or value that can be employed to authenticate the client device 109 and/or the user with the new management service 130.

As shown in step 339, enrollment of the client device 109 with the new management service 130 can be completed. The migration application 178 can transmit the enrollment information, as well as a device identifier, user credentials, and an identity of an enterprise to the new management service 130. For example, the migration application 178 can cause a the client device 109 to display a network site of the new management service 130, and can enter the enrollment token through the network site for authentication. The network site can be displayed on the client device 109 by the migration application 178 or a browser application 183. In some examples, a terms of service or another requirement can be displayed for acceptance by the user. The terms of service can be a terms of service associated with the enterprise. In one case, the terms of service can be identified in the management data requested from the previous management service 150 by the migration application 178 and can be transmitted to the new management service 130. Alternatively, the terms of service can be configured by an administrator through the migration service 115 and/or the new management service 130 providing the network site.

In other examples, the migration application 178 can authenticate with the new management service 130 using the enrollment token, and the terms of service can be displayed by a user interface of the migration application 178. Thereafter, the migration application 178 can render a user interface with a notification that the migration is complete. The migration application 178 can also provide a progress bar or other notifications in the user interface for each step in the migration process.

The migration application 178 can also cause the new management application 181 to be installed on the client device 109. The migration application 178 can cause the browser application 183 to access a URL through which the new management application 181 can be downloaded installed. In some cases, this can be the network site that can be displayed as described in step 339. Alternatively, the migration application 178 can be the new management application 181. Once the new management application 181 is installed, profiles, policies, commands, and other actions can be implemented on the client device 109 using the command queue of the new management service 130 in concert with the new management application 181. The profiles, policies, and settings applied to the client device 109 through the new management service 130 can be based on the management data (e.g., from the previous management service 150) in association with the client device 109 in the device data 135, enterprise data 138, and compliance rules 141. A new management profile associated with the new management service 130 can be installed on the client device 109 to complete the enrollment.

In some cases, the client device 109 can be assigned to one or more user groups initially upon enrollment with the new management service 130, based on the management data in association with the client device 109 in the device data 135, enterprise data 138, and compliance rules 141. Alternatively, once the client device 109 is enrolled, the new management application 181 can check-in and the new management service 130 can detect criteria associated with the client device 109 such as a geolocation, a device identifier, a user identifier, and a network connection. Based on such criteria, the new management service 130 can apply appropriate user group settings, policies, and profiles through the command queue.

Figure 4:
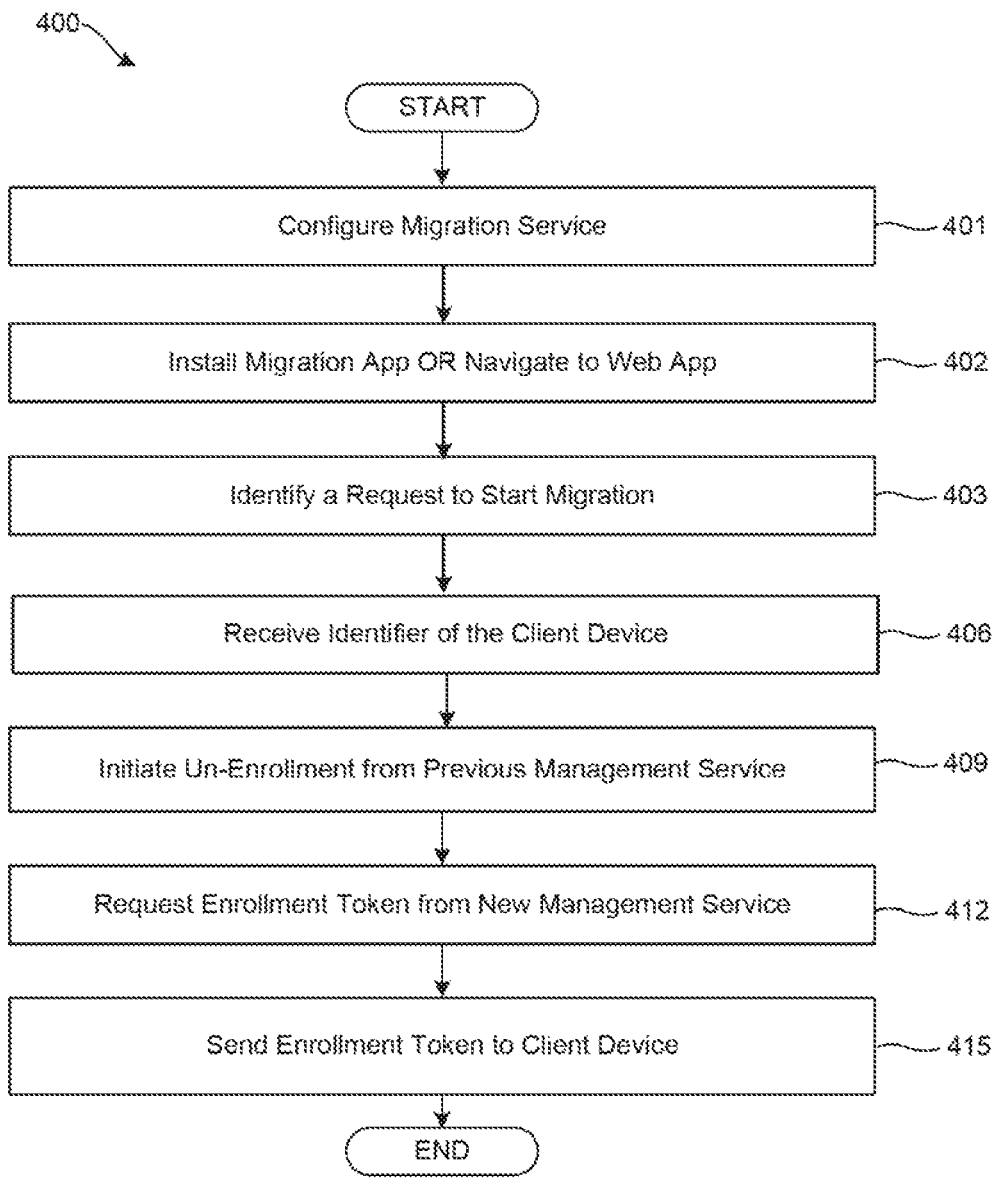
FIGS. 4-6 are flowcharts illustrating functionality implemented by components of the networked environment.

Turning to FIG. 4, shown is a flowchart 400 that illustrates an example of the operation of the migration service 115. FIG. 4 illustrates an example of how the migration service 115 and the migration application 178 can be used to perform a migration of the client device 109 from a previous management service 150 to a new management service 130.

In step 401, the migration service 115 can be configured. For example, an IT administrator can obtain a file that identifies users, their associated client devices 109, and additional data from the previous management service 150, and can input or upload the file including the migration data 121 through a user interface of a network site provided by the migration service 115. In some situations, the migration service 115 can query the previous management service 150 for a list of all users and associated client devices 109, for example, using Identity Services Engine (ISE) API. In other situations, the IT administrator can export data from the previous management service 150, or can manually create a list of users and their associated client devices 109. A tenant for the client device 109 can be provided to the migration service 115. A tenant can be associated with an enterprise or an organizational group of an enterprise that is associated with the client device 109. The migration service 115 can also be provided a server address for a previous management service 150 and a server address of new management service 130 for each client device 109, along with administrator credentials for each, which can be associated with and/or determined by the tenant. This information can be utilized, for example, using a Representational State Transfer (REST) API (e.g., tenant create and/or tenant update) during the migration. In some examples the migration service 115 can handle multi-tenant and multi-enterprise migrations. For example, multiple tenants can be configured for use at the same time.

In step 402, the migration service 115 can cause a migration application 178 to be installed on the client device 109. For example, the migration service 115 can send to the client device 109 a message including a link through which the migration application 178 can be accessed. The link can be sent to the client device 109 through email, text, or another messaging or notification service. A user can activate the link to download and or install the migration application 178 on the client device 109. The migration application 178 can render a user interface for display on the client device 109. In another example, a previous management service 150 can cause the migration application 178 to be installed on the client device 109 through a previous management application 182 that executes a command on the client device 109 from a command queue of the previous management service 150. Alternatively, the migration service 115 can cause a browser application 183 on the client device 109 to navigate to a link through which a web application 117 can be accessed. In this case, the browser application 183 can render for display on the client device 109 a user interface accessed through the web application 117.

In step 403, the migration service 115 can identify a request to start a migration of a client device 109 from a previous management service 150 to the new management service 130. The request to start a migration of a client device 109 from a previous management service 150 to the new management service 130 can be user-initiated or can be initiated through the previous management application 182 implementing an action in a command queue of the previous management service 150. In one example, the user can activate a button generated in a user interface of the migration application 178 or otherwise initiate the migration.

At step 406, the migration service 115 can receive from the migration application 178, the device identifier of the client device 109. In this situation, the migration application 178 can identify a device identifier by searching the data store 173 of the client device to identify a serial number or other device identifier of the client device 109. The migration application 178 can further search the data store 173 to identify a user identifier, a credential, an email address, or an identity of an enterprise. The migration application 178 can also enable features or functionalities of the client device 109. For example, the migration application 178 can enable a network adapter such as a WiFi adapter or 802.11 device to facilitate identifying a MAC address associated with the client device 109. The migration application 178 can transmit this identifier to the migration service 115. The device identifier can include a MAC address, on IP address, or another identifier of the client device 109. In some cases, the migration service 115 can also receive a user account associated with the client device 109, such as a user identifier, user credential, or a token.

In step 409, the migration service 115 can initiate an un-enrollment of the client device 109 from the previous management service 150. This can include sending a request the previous management service 150 or invoking an API of the previous management service 150. A request to un-enroll the client device 109 can include a MAC address, an IP address, a serial number, a UDID, user credentials, an identity of an enterprise managing the client device 109, administrator credentials, and other migration data. For example, administrator credentials can be required to authenticate with an API of the previous management service 150 to prove that the request is valid. The device identifier of the client device 109 transmitted in the request to un-enroll from the previous management service 150 can include a MAC address, an IP address, a serial number, or another identifier that facilitates identification of the client device 109. This information can be included with or determined by the migration application 178. Alternatively, an administrator can supply required information to the migration application 178 and/or the migration service 115.

Once the required information is provided to the previous management service 150, the previous management service 150 can provide a command to the client device 109 to perform un-enrollment. For example, the previous management service 150 can employ the previous management application 182 to perform actions on the client device 109 that are retrieved upon checking in with the previous management service 150. The previous management service 150 can store in its command queue a command to remove the previous management profile from the client device 109. Upon check-in, the previous management application 182 can identify the action and remove the previous management profile from the client device 109, completing the un-enrollment. In some cases the previous management service 150 can use a notification service to request that the client device 109 check-in with the previous management service 150. In other situations, the un-enrollment requirements can also include a number of other actions for the client device 109 to perform, such as uninstallation of client applications 175 related to the previous management service 150, removal of enterprise data, and removal of management data (e.g., enterprise wipe). In some cases, the migration application 178 can transmit to the previous management service 150 an indication that the un-enrollment of the client device 109 from the previous management service 150 is complete.

In step 412, the migration service 115 can request an enrollment token or other enrollment data 144 from the new management service 130. The new management service 130 can require the device identifier of the client device 109 and authentication information associated with the user in order to supply the enrollment token. The enrollment token can be used by the client device 109 to authenticate and/or identify the client device 109 to the new management service 130.

Figure 5:
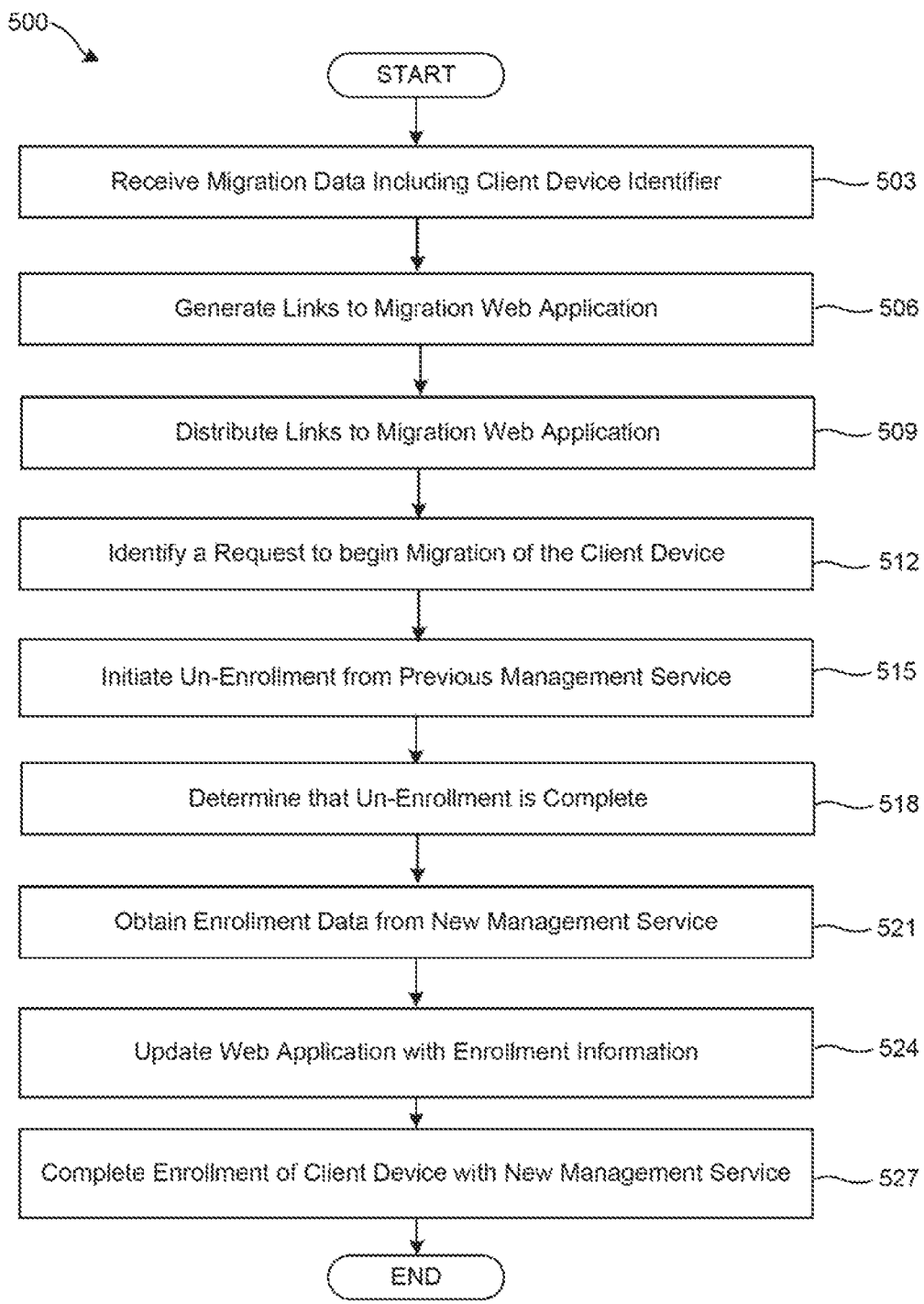

In step 415, the migration service 115 can send the enrollment token to the client device 109. For example, the migration service can transmit an update to the migration application 178 with an enrollment URL and the enrollment token. Thereafter, enrollment requirements can be completed on the client device 109. For example, the migration service 115 can send the enrollment token to the migration application 178, which can cause the client device 109 to display a network site of the new management service 130, and can enter the enrollment token through the network site for authentication. In some cases, a terms of service or other enrollment requirements can be presented and required to be accepted by the user before enrollment is completed. The terms of service can be a terms of service associated with the enterprise. In one case, the terms of service can be identified in the management data requested from me previous management service 150 by the migration application 178 and can be transmitted to the new management service 130. Alternatively, the terms of service can be configured by an administrator through the migration service 115 and/or the new management service 130 providing the network site. Referring now to FIG. 5, shown is a flowchart 500 that illustrates another example of the operation of the migration service 115. The flowchart of FIG. 5 illustrates an example of how the migration service 115 can be used to perform a migration of the client device 109 from a previous management service 150 to a new management service 130 using a browser application 183 accessing a web application 117. That is a migration application 178 on the client device 109 may not be used in the migration process.

Starting with step 503, the migration service 115 receives migration data 121 including device identifiers of client devices 109. The migration data 121 can include a device identifier for each client device 109, a server address of a previous management service 150 and a server address of new management service 130 for each client device 109, and an identity of an enterprise. The migration data 121 can be provided to the migration service 115 by an administrator or user associated with the migration process.

At step 506, the migration service 115 can generate links to the web application 117 of the migration service 115. Each of the links can be a unique link that can be utilized by one of the client devices 109, and the web application 117 or the migration service 115 can include a set of migration operations specified for the client device 109. Alternatively, the link can be specific to an enterprise or a particular migration operation of a set of client devices 109. Each of the links can include a respective parameter that uniquely identifies each of the respective client devices 109 being migrated. In other words, a particular client device 109 can use a link that includes a parameter associated with the particular client device 109, while other devices cannot use the link that includes the parameter associated with the particular client device.

Once the links to the web application 117 are generated, the links can be distributed in step 509 by the migration service 115. For example, an email can be sent to a user associated with the client device 109, or a message or push notification can be sent to the client device 109. Alternatively, the links can be sent to an enterprise and the enterprise can distribute the links to the users associated with the client devices 109.

At step 512, the migration service 115 identifies a request to begin migration of the client device 109 from the previous management service 150 to the new management service 130. The request to begin migration of the client device 109 from the previous management service 150 to the new management service 130 can be user-initiated. In other cases, the request can be administrator initiated, or can be automated. In one case, the browser application 183 can access the web application 117 of the migration service 115 and render a user interface on the client device 109 that is served up by the web application 117. The user interface can include a button, a slider, or another user interface element that can be activated to identify a user request to begin migration. Thereafter, the migration service 115 can conduct migration and can notify the user of progress through the user interface of the web application 117. Alternatively, the request to begin migration of the client device 109 can be initiated through the previous management application 182 implementing an action from a command queue of the previous management service 150. Further, the request to begin migration of the client device 109 can be initiated through an application or a network site of the migration service 115, for example, by an IT professional activating a user interface element of the network site or the application.

In step 515, the migration service 115 can initiate an un-enrollment of the client device 109 from the previous management service 150. Un-enrollment can be initiated by sending a request the previous management service 150 or calling an API of the previous management service 150 with a request to un-enroll the client device 109. The previous management service 150 can require a MAC address, an IP address, a serial number, a UDID, user credentials, an identity of an enterprise managing the client device 109, and other data in order to allow un-enrollment. This information can be extracted or derived from the migration data 121 and can be supplied by an enterprise or otherwise provided to the migration service 115. Once the required information is provided to the previous management service 150, the previous management service 150 can complete un-enrollment of the client device 109.

For example, the previous management service 150 can employ the previous management application 182 to perform actions on the client device 109 that are retrieved upon checking in with the previous management service 150. The previous management service 150 can store in its command queue an command to remove the previous management profile from the client device 109. Upon check-in, the previous management application 182 can identify the action and remove the previous management profile from the client device 109, completing the un-enrollment. In some cases the previous management service 150 can use a notification service to request that the client device 109 check-in with the previous management service 150. In other situations, the un-enrollment requirements can also include a number of other actions for the client device 109 to perform, such as uninstallation of client applications 175 related to the previous management service 150, removal of enterprise data, and removal of management data (e.g., enterprise wipe).

In step 518, the migration service 115 can determine that un-enrollment is complete. In some cases, the migration service 115 can invoke an API of the previous management service 150 to determine whether the client device 109 is currently enrolled. For example, an ISE API call to the previous management service 150 can be used. The device identifier and other data can be transmitted to the previous management service 150 when invoking the API (e.g., https://{previous management service 150 API URL}/devices/?querycriteria=macaddress &value={client device 109 MAC}&filter=all). The previous management service 150 API can provide a registration status (e.g., register_status "true" or "false") that indicates whether the client device 109 is enrolled with the previous management service 150. Based on the registration status provided by the previous management service 150, the migration service 115 can determine whether un-enrollment of the client device 109 is complete.

In step 521, the migration service 115 can obtain enrollment data 144 from the new management service 130. The new management service 130 can require a MAC address, an IP address, a serial number, a UDID, user credentials, an identity of an enterprise managing the client device 109, and other data in order to supply the enrollment data 144. The enrollment data 144 can be used by the client device 109 to allow enrollment with the new management service 130. Enrollment data 144 can include a uniform resource locator (URL) to a network site of the new management service 130, an enrollment token, or other information that can be used to communicate with the new management service 130.

In step 524, the migration service 115 can update the web application 117 with the enrollment information. For example, the migration service 115 can update the web application 117 with an enrollment URL and token obtained from the new management service 130.

In step 527, enrollment of the client device 109 with the new management service 130 can be completed. For example, after the migration service 115 updates the web application with the enrollment information, the web application 117 can redirect the client device 109 to display a network site of the new management service 130 to complete enrollment or present enrollment requirements. In some cases, a terms of service or other enrollment requirements of the enterprise can be presented and required to be accepted by the user before enrollment is complete. Alternatively, the web application 117 can render a user interface to present enrollment requirements such as a terms of service. A new management profile associated with the new management service 130 can be installed on the client device 109 to complete enrollment with the new management service 130.

Figure 6:
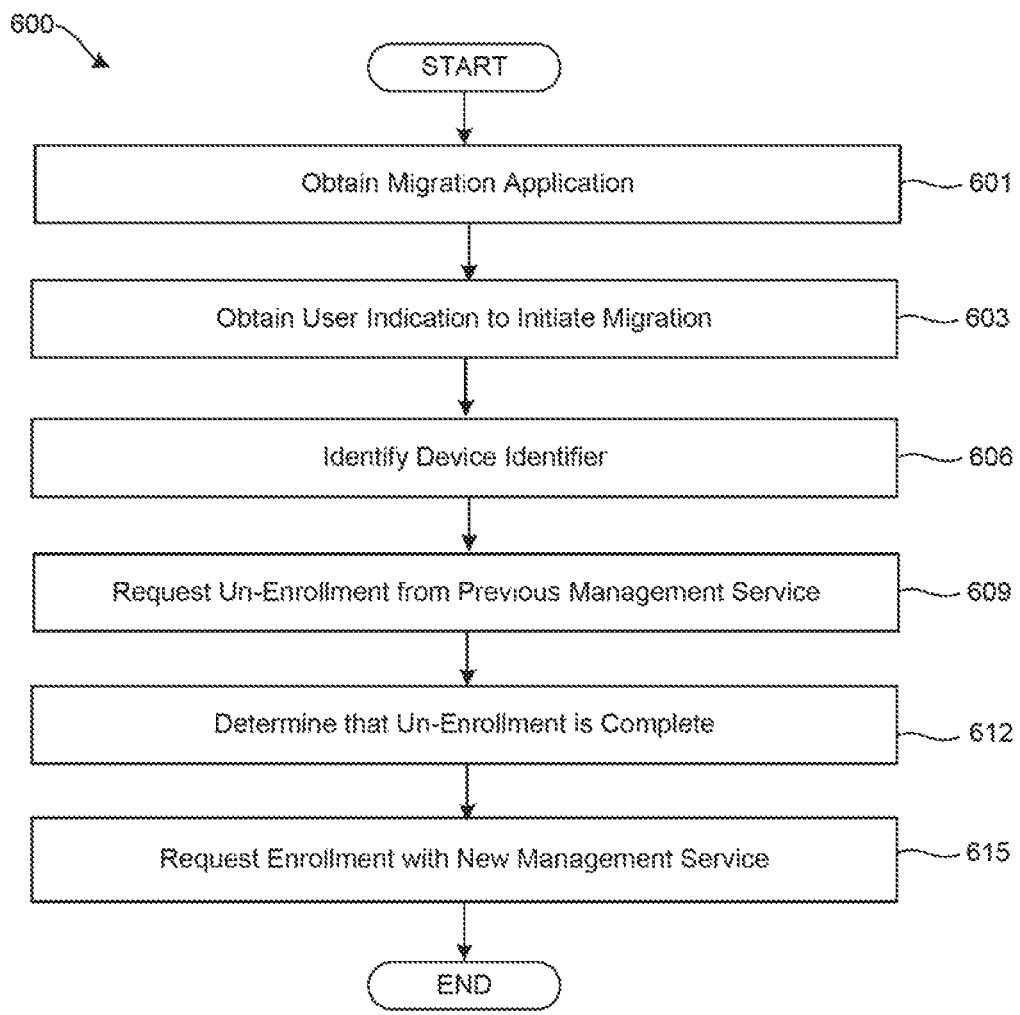
Figure 7A:
FIGS. 7A-D are drawings illustrating functionality implemented by components of the networked environment and rendered on the client device.
Figure 7B:
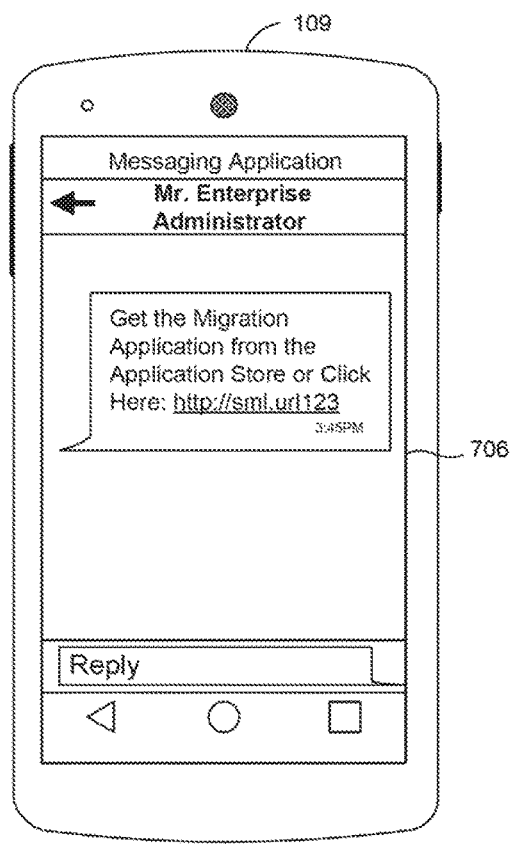
Figure 7C:
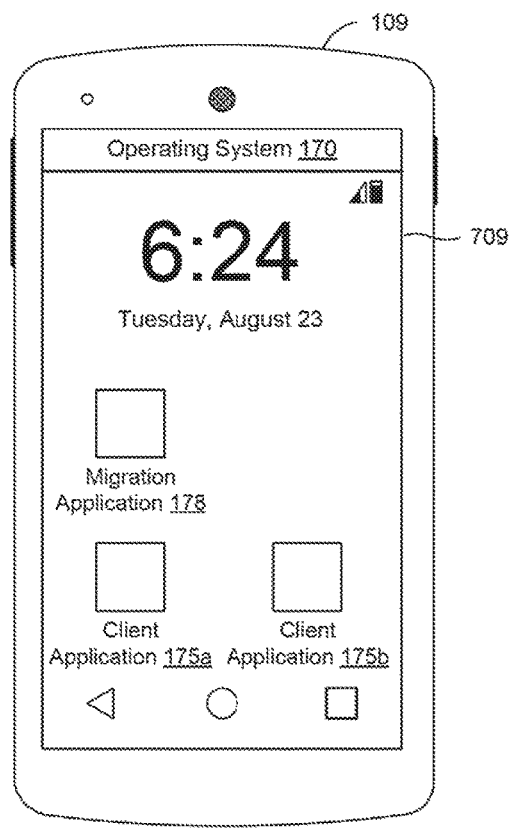
Figure 7D:
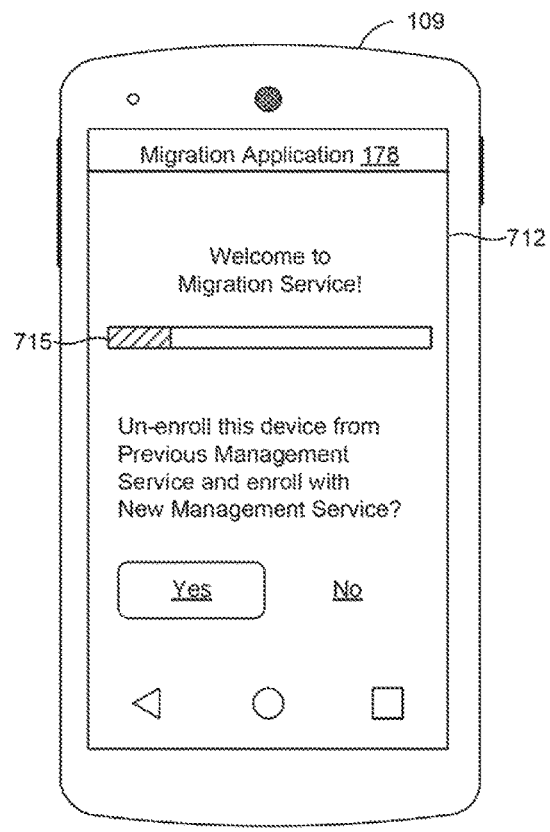

FIG. 6 shows a flowchart 600 that illustrates an example of the operation of the client device 109 to obtain and utilize the migration application 178. The flowchart of FIG. 6 illustrates an example of how the migration application 178 can be used to perform a migration of the client device 109 from a previous management service 150 to a new management service 130 with minimal use of a migration service 115, or without using the migration service 115.

Starting with step 601, the client device 109 can obtain the migration application 178. The migration application 178 can be retrieved by the client device 109 in response to a command pushed by the previous management service 150. In this example, the client device 109 can be enrolled with the previous management service 150, which can manage the client device 109 until un-enrolled. Alternatively, the client device 109 can download the migration application 178 from an application store or another network source. In some situations, a link to obtain the migration application 178 can be sent to the client device 109 by the new management service 130, the previous management service 150, or an enterprise managing the client device 109. Where the migration service 115 is utilized, the migration service 115 can send the link to retrieve the migration application 178.

A specific version of the migration application 178 can be provided that includes migration information. For example, an enterprise can want to migrate a set of client devices 109 from the previous management service 150 to a new management service 130. In one example, a version of the migration application 178 can be provided to perform this migration that includes migration information for the set of client devices 109. In another example, a configuration file can be downloaded and applied to the migration application 178, and the configuration file can include the migration information for the set of client devices 109.

The migration information can include a server address of the previous management service 150, a server address of the new management service 130, device identifiers such as MAC addresses, IP addresses, serial numbers, UDIDs, and user credentials, and an identity of an enterprise managing the client device 109. In some situations, the set of client devices 109 include various operating systems or platforms, and multiple versions can be provided to accommodate the various operating systems or platforms.

Alternatively, where the migration service 115 is used, when downloaded and installed, the migration application 178 can connect to a network source such as the migration service 115, the new management service 130, or another network source and obtain migration data 121 associated with the migration from the migration service 115.

In step 603, the migration application 178 identifies a request to initiate migration from the previous management service 150 to the new management service 130. For example, the migration application 178 can be executed in the client device 109 and generate a user interface that identifies a user request to un-enroll the client device 109 from the previous management service 150 and enroll the client device 109 with the new management service 130 or a request to migrate the client device 109 from the previous management service 150 to the new management service 130.

At step 606, the migration application 178 can identify a device identifier of the client device 109. For example, the device identifier of the client device 109 can be a serial number, a UDID, a MAC address, an IP address, or another type of identifier associated with the client device 109, and can be determined by searching the data store 173 of the client device 109, enabling a network adapter of the client device 109 and/or connecting to a particular network.

In step 609, the migration application 178 can request an un-enrollment of the client device 109 from the previous management service 150. This can constitute initiating an un-enrollment process. The previous management service 150 can require a MAC address, an IP address, a serial number, a UDID, user credentials, an identity of an enterprise managing the client device 109, and other data in order to allow un-enrollment. Once the required information is provided to the previous management service 150, the previous management service 150 can cause the client device 109 to perform un-enrollment of the client device 109 from the previous management service 150.

For example, the previous management service 150 can employ the previous management application 182 to perform actions on the client device 109 that are retrieved upon checking in with the previous management service 150. The previous management service 150 can store in its command queue a command to remove the previous management profile from the client device 109. Upon check-in, the previous management application 182 can identify the action and remove the previous management profile from the client device 109, completing the un-enrollment. In some cases the previous management service 150 can use a notification service to request that the client device 109 check-in with the previous management service 150. In other situations, the un-enrollment requirements can also include a number of other actions for the client deuce 109 to perform, such as uninstallation of client applications 175 related to the previous management service 150, removal of enterprise data, and removal of management data (e.g., enterprise wipe).

In step 612, the migration application 178 can determine that un-enrollment is complete. In some cases, the migration application 178 can send a request or invoke an API of the previous management service 150 to determine whether the un-enrollment process is complete. The device identifier and other data can be sent to the previous management service 150 when invoking the API. In other embodiments, the migration application 178 can determine that un-enrollment commands and requirements have been completed in the client device 109 to determine that the un-enrollment is complete.

In step 615, the migration application 178 can request enrollment with the new management service 130. The new management service 130 can require a MAC address, an IP address, a serial number, a UDID, user credentials, an identity of an enterprise managing the client device 109, and other data in order to initiate enrollment through the request. In some situations, enrollment data 144 can be sent to the client device 109 to allow enrollment with the new management service 130. For example, enrollment data 144 can include a URL of the new management service 130, an enrollment token, or other information that can be used to communicate with the new management service 130. In some situations, a terms of service or other enrollment requirements can be presented and required to be accepted by the user before enrollment is completed. Enrollment can be completed by causing the client device 109 to install a new management profile associated with the new management service 130.

The migration application 178 can render a user interlace to present the terms of service or other requirements and complete enrollment. Alternatively, the migration application 178 can redirect the client device 109 to display a network site of the new management service 130, and the network site can present enrollment requirements that must be completed by die user. In some instances, the migration application 178 can redirect the client device 109 using the token, or can enter the token in a prompt of the network site.

With reference to FIG. 7, shown is an example illustration of a client device 109 executing an email application to render a user interface 703. The user interface 703 shows an email message slating "Welcome to Migration Service!," and presents a prompt asking whether the user wants to un-enroll the client device 109 from a previous management service and enroll with a new management service. A user can select "Yes" or "No." If the user selects "Yes," the client device 109 can be directed to the web application 117 by the operating system 170 toggling to a browser application 183 that is seeded with a URL for the web application 117. To this end, a selection of a hyperlink corresponding to the displayed "Yes" option can initiate a migration and invoke a unique link generated for the client device 109. While FIG. 7 shows the link as a button in an email message, a plain-text URL or other link can be provided through email, text, push notification, or a client application 175. In some instances, the email message can have a link to the web application 117, and the web application 117 can present a user interface that obtains the user indication to initiate the migration.

FIG. 8 shows an example illustration of a client device 109 executing a messaging application to render a user interface 706. The user interface 706 shows a text message that presents a link to download the migration application 178 and notifies the user that the migration application 178 can be obtained from the application store. In some cases, a particular version of the migration application 178 can be linked by the provided link. The text message appears to be sent from "Enterprise Administrator." The enterprise administrator or oilier representative of the enterprise can send the text message. Alternatively, the migration service 115 can send the text message and cause it to appear that it is sent from the enterprise administrator. While FIG. 8 shows the text message with the link to download the migration application 178, the text message could be sent with a link to the web application 117.

FIG. 9 shows an example illustration of a client device 109 executing an operating system 170. The operating system 170 is rendering a user interface 709 that includes the migration application 178, and client applications 175*a* and 175*b* of the client applications 175. The migration application 178 can be downloaded to the client device 109 from an application store or repository, or from a link provided to a user or sent to the client device 109. Alternatively, the migration application 178 can be retrieved by the client device 109 in response to a command from the previous management service 150. As shown in FIG. 9, a user can select the migration application 178 from the user interface 709 to execute it, or a command can be pushed from the previous management service 150.

FIG. 10 shows an example illustration of the client device 109 executing the migration application 178 to render a user interface 712. The user interface 712 includes the introductory statement, "Welcome to Migration Service!" and presenting a prompt asking whether the user wants to un-enroll the client device 109 from a previous management service and enroll with a new management service. The user interface 712 includes user interface elements corresponding to "Yes" or "No." If the user selects "Yes," by activating the corresponding user interface element, the client device 109 can begin the migration process using the client device 109. The migration application 178 can perform the migration. Alternatively, the migration application can communicate with the migration service 115 to perform the migration in conjunction with the migration service 115. The user interface 712 includes a progress bar 715 as a visualization aid that can be updated to provide status information about the migration operation at certain points in the migration as discussed.

The client devices 109 or devices comprising the migration system 103, the new management system 106, and the previous management system 108 can include at least one processor circuit, for example, having a processor and at least one memory device, both of which couple to a local interface, respectively. The device can include, for example, at least one computer, a mobile device, smartphone, computing device, or like device. The local interface can include, for example, a data bus with an accompanying address/control bus or other bus structure.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or oilier memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 109 can include a display upon which a user interface 169 generated by the client application 175 or another application can be rendered. In some examples, the user interface 169 can be generated with user interface data provided by the migration system 103. The client device 109 can also include one or more input/output devices that can include, for example, a capacitive touchscreen or other type of touch input device, fingerprint reader, or keyboard.

Although the migration service 115, new management service 130, previous management service 150, client applications 175, migration application 178, and other various services and functions described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates. Field-programmable gate arrays (FPGAs) or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of implementations described for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   at least one computing device; and
   program instructions executable in the at least one computing device that, when executed, cause the at least one computing device to:
   receive a file encoding migration data to migrate a plurality of client devices from a first management service to a second management service, the migration data comprising a device identifier associated with a client device of the plurality of client devices;
   generate a link to a web application provided by the at least one computing device;
   send the link to the web application to a user of the client device, wherein the web application is accessed by the client device based on the link;
   identify a request to migrate the client device from the first management service to the second management service, the request being identified based on a user-initiated activation of a user interface element of the web application;
   cause the client device to be un-enrolled from the first management service by causing a first management profile associated with the first management service to be removed from the client device;
   obtain enrollment data from the second management service; and
   cause the client device to be enrolled with the second management service by causing a second management profile associated with the second management service to be installed on the client device.

2. The system of claim 1, wherein the link to the web application is a unique link that is generated for the client device of the plurality of client devices.

3. The system of claim 1, further comprising program instructions executable in the at least one computing device that, when executed, further cause the at least one computing device to cause a browser application to render the user interface of the web application on the client device that identifies the request to migrate the client device from the first management service to the second management service.

4. The system of claim 1, further comprising program instructions executable in the at least one computing device that, when executed, further cause the at least one computing device to cause a browser application to render a user interface of the web application on the client device that includes a migration status of the client device from the first management service to the second management service.

5. The system of claim 1, further comprising program instructions executable in the at least one computing device that, when executed, further cause the at least one computing device to cause a browser application to redirect to a network page associated with the second management service.

6. The system of claim 1, further comprising program instructions executable in the at least one computing device that, when executed, further cause the at least one computing device to invoke an Application Program Interface (API) of the first management service to determine that the client device is un-enrolled from the first management service.

7. The system of claim 1, further comprising program instructions executable in the at least one computing device that, when executed, further cause the at least one computing device to cause a request to enroll the client device with the second management service to be sent to the second management service, the request comprising the device identifier.

8. The system of claim 1, further comprising program instructions executable in the at least one computing device that, when executed, further cause the at least one computing device to authenticate the client device with the second management service using the enrollment data.

9. The system of claim 1, wherein the enrollment data comprises an enrollment link associated with the second management service.

10. A computer-implemented method, comprising:
receiving a file encoding migration data to migrate a plurality of client devices from a first management service to a second management service, the migration data comprising a device identifier associated with a client device of the plurality of client devices;
generating a link to a web application provided by the at least one computing device;
sending the link to the web application to a user of the client device, wherein the web application is accessed by the client device based on the link;
identifying a request to migrate the client device from the first management service to the second management service, the request being identified based on a user-initiated activation of a user interface element of the web application;
causing the client device to be un-enrolled from the first management service by causing a first management profile associated with the first management service to be removed from the client device;
obtaining enrollment data from the second management service; and
causing the client device to be enrolled with the second management service by causing a second management profile associated with the second management service to be installed on the client device.

11. The computer-implemented method of claim 10, wherein the link to the web application is a unique link that is generated for the client device.

12. The computer-implemented method of claim 10, further comprising causing a browser application to render a user interface of the web application on the client device that identifies the request to migrate the client device from the first management service to the second management service.

13. The computer-implemented method of claim 10, further comprising causing a browser application to render a user interface of the web application on the client device that includes a migration status of the client device from the first management service to the second management service.

14. The computer-implemented method of claim 10, further comprising causing a browser application to redirect to a network page associated with the second management service.

15. The computer-implemented method of claim 10, further comprising determining that the client device is un-enrolled from the first management service by invoking an API of the first management service.

16. The computer-implemented method of claim 10, further comprising causing a request to be sent to the first management service to un-enroll the client device from the first management service, the request comprising a device identifier.

17. The computer-implemented method of claim 10, wherein obtaining the enrollment data comprises sending a request to the second management service, the request comprising a device identifier.

18. A non-transitory computer-readable medium embodying program instructions executable in at least one computing device that, when executed, cause the at least one computing device to:
receive a file encoding migration data to migrate a plurality of client devices from a first management service to a second management service, the migration data comprising a device identifier associated with a client device of the plurality of client devices;
generate a link to a web application provided by the at least one computing device;
send the link to the web application to a user of the client device, wherein the web application is accessed by the client device based on the link;
identify a request to migrate the client device from the first management service to the second management service, the request being identified based on a user-initiated activation of a user interface element of the web application;
cause the client device to be un-enrolled from the first management service by causing a first management profile associated with the first management service to be removed from the client device;
obtain enrollment data from the second management service; and
cause the client device to be enrolled with the second management service by causing a second management profile associated with the second management service to be installed on the client device.

19. The non-transitory computer-readable medium of claim 18, wherein the link to the web application is a unique link that is generated for the client device.

20. The non-transitory computer-readable medium of claim 18, further comprising program instructions executable in the at least one computing device that, when executed, further cause the at least one computing device to cause a browser application to render a user interface of the web application on the client device that identifies the request to migrate the client device from the first management service to the second management service.

* * * * *